United States Patent [19]

Wu

[11] Patent Number: 4,541,489

[45] Date of Patent: Sep. 17, 1985

[54] METHOD OF REMOVING FLOW-RESTRICTING MATERIALS FROM WELLS

[75] Inventor: Yulin Wu, Bartlesville, Okla.

[73] Assignee: Phillips Petroleum Company, Bartlesville, Okla.

[21] Appl. No.: 590,828

[22] Filed: Mar. 19, 1984

[51] Int. Cl.[4] .................. E21B 21/00; E21B 37/06
[52] U.S. Cl. .................. 166/312; 166/902; 166/295; 166/276
[58] Field of Search .............. 166/244 C, 276, 281, 166/285, 295, 312

[56] References Cited

U.S. PATENT DOCUMENTS

| | | | |
|---|---|---|---|
| 3,402,770 | 9/1968 | Messenger | 166/312 |
| 3,976,135 | 8/1976 | Anderson | 166/295 |
| 4,072,194 | 2/1978 | Cole et al. | 166/295 |
| 4,085,059 | 4/1978 | Smith et al. | 252/90 |
| 4,276,186 | 6/1981 | Bakos et al. | 252/DIG. 8 |
| 4,323,662 | 4/1982 | Oba et al. | 525/281 |

Primary Examiner—Stephen J. Novosad
Assistant Examiner—Bruce M. Kisliuk
Attorney, Agent, or Firm—C. F. Steininger

[57] ABSTRACT

Flow-restricting materials containing epoxy resins present in a well treated with an epoxy resin, for the purpose of coating and consolidating unconsolidated sand adjacent the well and/or gravel packing in the well, or of coating metallic equipment in the well, to prevent corrosion or the deposition of organic or inorganic solids on the equipment, by contacting the flow-restricting material with a solvent composition, comprising, N-methyl-2-pyrrolidone and a diluent in an amount of 0 to 80% by wt., for a time sufficient to form a flowable fluid and removing the flowable fluid from the well. Combination well treatments include consolidating sand and/or gravel in a well or coating metallic equipment in the well with an epoxy resin and, thereafter, subjecting the treated well to the above solvent treatment to remove flow-restricting materials from the well.

22 Claims, No Drawings

METHOD OF REMOVING FLOW-RESTRICTING MATERIALS FROM WELLS

The present invention relates to an improved method for removing flow-restricting materials from wells penetrating a subsurface earth formation. A more specific aspect of the present invention is to provide an improved method for removing flow-restricting materials from wells penetrating a subsurface earth formation which have been treated with an epoxy resin.

BACKGROUND OF THE INVENTION

In the production of fluids such as oil, gas and water from inaccessible subsurface earth formations, it is conventional practice to drill a well penetrating the formation of interest, case the well and perforate the casing opposite the formation of interest and, in many cases, dispose a production tubing in the casing. Fluids are then produced through the casing perforations and up the tubing or from an open hole below the casing by natural pressure forces, natural water drive or natural gas drive or a pump is mounted on the lower end of the tubing. To the extent that natural forces or pumping are inadequate, it is also common practice to inject displacing fluids into the well either periodically with periodic production cycles or into a separate injection well or wells penetrating the formation of interest.

In many cases the fluid-containing formation of interest comprises an unconsolidated sand. As a result, during production sand passes into the well and through the producing equipment along with produced fluids. Serious problems are created by such sand production, including, primarily, severe erosion of downhole equipment and plugging of the casing perforations, producing equipment or the entire bottom of the well. This problem is overcome in one of two conventional manners, namely, by gravel packing the bottom of the well opposite the formation of interest, simply by filling the bottom of the well with gravel, or by consolidating the unconsolidated sand formation immediately adjacent the well. It is also common practice and preferred to consolidate a gravel pack to form a solid, permeable pack. A particularly useful consolidating material is an epoxy resin. The epoxy resin may be deposited by introducing a fluent single composition of an epoxy compound, a curing agent for the epoxy compound, a solvent adapted to maintain the epoxy in a fluent condition until it is in place, a diluent and, optionally, a cure retarder. The solution is pumped down the well and into the sand surrounding the well or into the gravel pack or both, the fluid is maintained in place for a time sufficient to form an intermediate resinous reaction product between the curing agent and the epoxy compound, which precipitates from the solution onto the surface of the sand or gravel particles and which precipitate prefentially wets the sand or gravel particles by virtue of other components of the composition, such as certain curing agents. Further, contact time then converts the epoxy coating on the particles to a hard epoxy resin and, at the same time, cements the particles together. Excess treating solution containing the epoxy resin is then removed from the void spaces between the particles, by washing the same out with an appropriate external fluid or fluid produced from the formation, to thus produce a permeable consolidated mass of sand and/or gravel.

Another problem often encountered in the production of fluids from subsurface formations is the deposition of materials present in the produced fluids or produced along with the produced fluids, for example, waxes and asphalts contained in produced oils and inorganic solids. The buildup of such deposits obviously tends to plug the casing perforations and the producing equipment, thereby restricting flow of the fluids to be produced. One method of preventing the deposition and buildup of these materials is to deposit a coating of an epoxy resin on the surfaces of the casing, the tubing and well equipment which is in contact with the produced fluids. The epoxy coating, in this case, need not be completely cured to a hardened coating but may simply be a coating of the intermediate precipitated product which remains soft. However, in either case, the coating adheres to the well equipment and presents a smooth, slick surface which resists formation of deposits thereon. The epoxy resin coating may be deposited on the equipment in the same manner utilized in sand or gravel consolidation. In such operations, a mass of gunky material containing epoxy resin sometimes forms in the formation adjacent the well and in the bottom of the well, at times completely plugging the well. It is not known whether this gunky material is simply excess epoxy resin or epoxy resin in combination with deposit-forming materials from the formation. In any event, cleanout of this material to restore production of desired fluids can be an expensive operation.

Yet another problem encountered in most fluid-producing wells is corrosion of the downhole equipment. Such corrosion is caused by materials, such as sulfur compounds, present in the fluids being produced, which corrosion is aggravated by the presence of water which is usually present in varying amounts even in oil and gas producing formations. It has been found that such corrosion can also be prevented by coating the metallic well equipment with an epoxy resin. Again, a coating of the epoxy resin on the downhole equipment can be accomplished in generally the same fashion as the coating and consolidation of sand and gravel. It has also been found that following such treatments, wells can become plugged with a gunky material containing epoxy resin. Removal of this flow-restricting material is extremely expensive by conventional techniques.

SUMMARY OF THE INVENTION

It is therefore an object of the present invention to provide an improved method for overcoming the above-mentioned and other problems of the prior art. Another object of the present invention is to provide an improved method of removing flow-restricting materials from a well penetrating a subsurface earth formation. Yet another object of the present invention is to provide an improved method for removing flow-restricting materials from a well penetrating a subsurface formation which has been treated with an epoxy resin. Another and further object of the present invention is to provide an improved method for removing flow-restricting materials containing an epoxy resin from a well penetrating a subsurface earth formation which is simple in operation and relatively inexpensive. A still further object of the present invention is to provide an improved method of consolidating unconsolidated sand and/or gravel at the bottom of a well penetrating a subsurface earth formation and removing flow restricting materials containing epoxy resins from the void spaces between the particles of sand and/or gravel. A still further object of the present invention is to provide an improved method of coating downhole equipment in a well penetrating a subsurface formation with an epoxy resin and removing flow-restricting materials containing epoxy resin from the well. These and other objects of the present invention will be apparent from the following detailed description.

DESCRIPTION OF THE PREFERRED EMBODIMENTS

As previously indicated, when a well is treated with the composition for forming an epoxy resin coating on sand and/or gravel particles and consolidating the same or forming a coating on downhole well equipment, it has been found that, in some cases, a gunky, flow-restricting material deposits in the bottom of the well and/or the formation surrounding the well, which in some cases, completely plugs the well and stops fluid production from the formation. The nature of this flow-restricting material is not known but includes epoxy material, possibly from the use of more than is necessary to perform the coating and consolidation or coating operation, either in its uncured, partially cured or cured form and materials from the formation which are any and all of waxes, asphalts, precipitated organic or inorganic materials and the like. Accordingly, these materials will be referred to in the present application as flow-restricting materials, irrespective of their nature, the limiting criteria being only that they are formed in wells and/or formations surrounding the well penetrating a fluid producing formation which has been treated with a composition adapted to form a partially or fully cured epoxy resin.

It has been found in accordance with the present invention that conventional well cleanout solvents are incapable of removing the above-mentioned flow-restricting materials from wells which have been treated with epoxy resin-forming compositions. For example, it has been found that acetone and methanol are ineffective in removing such flow-restricting materials from a well, even though the latter is an effective solvent for epoxy-forming materials in the treating solution.

In accordance with the present invention, it has been found that flow-restricting materials formed in or adjacent to a well, which has been treated with an epoxy resin forming composition, can be removed by contacting the flow-restricting materials with N-methyl-2-pyrrolidone and from 0 to about 80% by wt. of a diluent, maintaining the solvent in contact with the flow-restricting material for a time sufficient to form a flowable fluid and removing the flowable fluid from the well.

In accordance with another embodiment of the present invention, a protective coating is formed on metallic equipment in a well by contacting the metallic equipment with an epoxy resin, a curing agent for the epoxy resin, an alcohol and a hydrocarbon diluent, maintaining the composition in contact with the metallic equipment for a time sufficient to form a partially cured or fully cured coating of epoxy resin on the metallic equipment, thereafter introducing a solvent comprising N-methyl-2-pyrrolidone and from 0 to 80 wt. % of a diluent into the well in contact with the flow-restricting equipment contacted by the epoxy resin composition, maintaining the solvent composition in the well for a period sufficient to form a flowable fluid and removing the flowable fluid from the well.

In yet another embodiment of the present invention, rock particles, including sand and gravel, are coated with an epoxy resin and consolidated by contacting the rock particles with an epoxy resin composition comprising an epoxy resin, a curing agent for the epoxy resin, an alcohol and a hydrocarbon diluent, maintaining the epoxy resin composition in contact with the rock particles for a time sufficient to coat the rock particles with epoxy resin and consolidate the same, contacting the rock particles contacted by the epoxy resin composition with a solvent comprising N-methyl-2-pyrrolidone and 0 to 80% by weight of a diluent for a time sufficient to form a flowable fluid and removing the flowable fluid from the well.

Epoxy resin coatings can be formed on solid surfaces in a well by forming a single solution, including an epoxy resin, a curing agent for the epoxy resin, a solvent for the epoxy resin and curing agent and a diluent.

Suitable epoxy resins are well known to those skilled in the art and include epoxy resins having more than one vicinal epoxy group per molecule. The epoxy resin may be saturated or unsaturated, aliphatic, cycloaliphatic, aromatic or heterocyclic and may contain substituents which do not materially interfere with the curing reaction. The epoxy resins may also be monomeric or polymeric, having molecular weights anywhere from about 50 to 10,000 and preferably between about 200 and about 1500. A particularly suitable material is the reaction product of epichlorohydrin and 2,2-bis(4-hydroxyphenyl) propane (bisphenol A). Suitable epoxy resins are disclosed in a number of patents as well as the literature, for example, U.S. Pat. Nos. 3,294,165 and 4,074,760 which are incorporated herein by reference for such disclosure.

Curing agents for epoxy resins are also well known in the art and generally include active hydrogen-containing compounds, e.g., polyamines, dianhydrides and the like. Particularly useful curing agents in accordance with the present invention are polyamines, which may be aliphatic, cycloaliphatic, aromatic or heterocyclic and particularly useful are aliphatic polyamines. A preferred material for use as a curing agent is N-tallow-1, 3 diaminopropane. Amines are particularly useful since they impart preferential wetting properties to the epoxy resin composition as well as acting as curing agents for the epoxy resin. Suitable curing agents are also disclosed in U.S. Pat. Nos. 3,294,165 and 4,074,760, which are incorporated herein for such disclosure.

Suitable solvents are alcohols having from 1–15 carbon atoms such as methanol, ethanol, isopropanol, N-propanol, N-butanol, isobutanol, secondary butanol, tertiary butanol and mixtures thereof. A preferred solvent is methanol.

Diluents may be either organic diluents which are compatible with the epoxy resin composition, as well as water. Preferred organic diluents are xylene, toluene, benzene, naphtha, cyclohexylbenzene, fuel oil, diesel oil, aromatic oils, Stoddard solvent, crude oil and condensate. Preferred organic solvents are aromatic hydrocarbons and particularly xylene. As pointed out in U.S. Pat. No. 4,074,760, the diluent or carrier may also be an aqueous carrier. In this particular instance, the aqueous carrier may be substantially pure water, or brine, which is compatible with water of the subsurface formation. Such aqueous carrier preferably is substantially free of polyvalent metal cations. The carrying capacity of the water can be improved by the inclusion of viscosity builders and the epoxy resin composition also contains a quaternary ammonium surfactant. Said U.S. Pat. No. 4,074,760 is incorporated herein for such disclosure.

The ratio of polyamine curing agent to epoxy resin in the epoxy resin composition may range anywhere between about 1,000-1 and 1-500, preferably between about 100-1 and 1-50 and most preferably between about 10-1 and 1-5. This ratio is of course selected on the basis that the epoxy resin composition will remain fluent until it has been pumped into the well and placed in contact with the solid structures to be coated with epoxy resin.

The solvent may be present in amounts between about 1 to 99% by weight, preferably between 10 to 60% by weight and most preferably between about 30 to 50% by weight. Again, the character and amount of the solvent is selected so as to maintain the epoxy resin and curing agent in solution and prevent precipitation of epoxy resin until the composition is placed in the wellbore for curing.

The diluent or carrier is utilized in amounts sufficient to maintain the epoxy resin composition in a fluid, pumpable form and obviously depends upon the ingredients, the character of the ingredients and the time necessary to place the composition in the wellbore.

If necessary or desirable, the epoxy resin composition may also contain a cure rate modifier. Such modifiers are required where the cure rate is shorter than the time necessary to place the composition down the wellbore. Cure rate modifiers include ketones, aldehydes and aromatic hydrocarbons and where an aromatic hydrocarbon is utilized as a diluent or carrier, it may also serve the dual function of acting as a cure rate modifier.

The epoxy resin composition may also include a coupling agent adapted to enhance the bond between the solid material to be coated and the epoxy resin or a suitable wetting agent to cause the epoxy resin to preferentially wet the surface to be coated. Suitable surfactants are, of course, advantageous wetting agents. Where the material to be coated is a non-metallic particulate material, such as sand or other silicaceous materials, coupling agents such as organosilicon compounds or silanes may be utilized.

Where metallic well equipment is to be coated with epoxy resin, such coating is carried out by pumping the epoxy resin composition down the well bore into contact with the metal surfaces to be coated, maintaining the epoxy resin composition in contact with the metal surfaces for a time sufficient to precipitate in soluble epoxy resin, deposit the same on the metal surfaces and partially or completely cure the epoxy resin. Where metallic surfaces are to be coated to prevent corrosion, deposition of solid material such as waxes and asphalts or deposition of solid scale-forming materials such as alkaline earth carbonates and sulfates, it is not necessary that the epoxy resin be completely cured. Instead, the epoxy resin may be partially cured to thereby leave a soft, coating on the metal surfaces. Whether partially or fully cured, the epoxy resin coating adheres to the metallic surfaces and is sufficiently slick to prevent the deposition of deleterious materials thereon and also to prevent contact of the metal with corrosion forming materials.

The single solution epoxy resin composition may be preceded by a spearhead fluid adapted to remove incompatible fluids from the surfaces to be contacted, change the wettability of the surfaces to be contacted or deposit a coupling agent thereon.

The epoxy resin composition may also be introduced in a sequential manner, for example, by forming a solution of the carrier or diluent and epoxy resin and a separate solution of the diluent or carrier, the solvent and a curing agent and introducing the same in any sequence. The preferred sequence of course is to first introduce the solution of curing agent since, where amines are utilized, the curing agent also acts as a wetting agent.

Where the epoxy resin is to be deposited on unconsolidated sand of a subsurface formation or a "gravel packing" material disposed in the borehole or the borehole and any cavity in the subsurface formation, such as that formed by drilling the borehole, producing fluids, etc., the epoxy resin composition may be introduced as a single solution or sequentially as indicated above. In addition, it is also possible to precoat materials used as a gravel pack at the surface of the earth and pump the same as a slurry into the well. It is generally thought that by knowing the porosity of permeability of an unconsolidated subsurface formation, it is possible to calculate the amount of surface to be coated and limit the amount of epoxy resin utilized to the thus calculated amount. However, in practice, such determinations are not accurate and, as a result, excess epoxy resin is usually present. Also, where gravel pack materials are to be deposited which have been precoated, it has been suggested that no additional epoxy resin be present in the slurry thus deposited. However, attrition and washing during placement of the coated particles will result in free epoxy resin being present in the well and some epoxy resin will generally be necessary in order to properly consolidate the particulate material in the well. In any event, it is necessary that any epoxy resin, as well as other flow-restricting materials present in the pores of the consolidated sand and/or gravel pack be removed from the void spaces between the sand or gravel to produce a permeable consolidated pack.

When a "gravel pack" or "gravel packing" is referred to herein, these terms are meant to include any of the known solid particulate materials utilized for this purpose. For example, various sands, gravel, walnut hulls and other nut shells, fruit pits, synthetic resins, gilsonite, coke, glass beads and similar particulate materials can be employed and are generally included within the "gravel pack" terminology.

The above-mentioned epoxy resin compositions are self curing and form thermoplastic epoxy resins under the conditions present in subsurface formations, i.e., a high temperature and/or high pressure.

The solvent compositions of the present invention include N-methyl-2-pyrrolidone and a suitable diluent or carrier.

The diluent or carrier may be any suitable organic material, such as carbon disulfide, benzene, toluene and xylene. Xylene has been found to be a particularly suitable diluent.

While N-methyl-2-pyrrolidone alone has been found effective for the removal of flow restricting materials from a subsurface well, it is preferable to add a diluent or carrier to reduce the cost of the treatment. The diluent or carrier may be utilized in amounts between about 30 to 80% by weight of the solution. 50—50 mixtures of N-methyl-2-pyrrolidone and xylene have been found quite effective.

The well that has been treated with an epoxy resin composition and contains flow-restricting materials is treated in accordance with the present invention by pumping the solvent composition of the present invention into the well and into contact with the flow-restricting materials, maintaining the solvent composition in contact with the flow-restricting materials for a period sufficient to solvate and produce a flowable fluid containing the flow-restricting materials and thereafter removing the solvent solution containing the flow-restricting materials from the well. The solvent composition may be preceded by an appropriate spearhead material and/or followed by an appropriate displacing fluid.

The solvent composition of the present invention may also be utilized in a convenient combination treatment for the deposition of epoxy resin on metallic surfaces in the well. In this case, the above-mentioned epoxy resin composition is pumped into the well in contact with the metallic surfaces to be coated, the epoxy resin composition is maintained in contact with the metallic surfaces for a time sufficient to deposit epoxy resin thereon and partially or fully cure the epoxy resin and the solvent composition of the present invention is then introduced into the well into contact with any flow-restricting materials present therein, maintained in contact with flow-restricting materials for a time sufficient to solvate the same and form a flowable fluid and the flowable fluid is then removed from the well. As previously indicated, such a combination treatment is highly effective for reducing corrosion of metallic equipment in the well and preventing the deposition on metallic equipment of solid materials, such as waxes and asphalts and inorganic scale-forming materials.

The solvent composition of the present invention is also highly effective as a combination treatment for the deposition of an epoxy resin on an unconsolidated, non-metallic, particulate material in a well. In accordance with this embodiment an epoxy resin composition, as specified above, is introduced into the well in contact with the particulate material to be coated, the epoxy resin composition is maintained in contact with the particulate material for a time sufficient to deposit epoxy resin on the surfaces of the particulate material and partially or fully cure the epoxy resin and thereafter the solvent composition of the present invention is introduced into the well into contact with the coated particulate material, maintained in contact with the particulate material for a time sufficient to solvate flow-restricting materials in the void spaces between the particles and form a flowable fluid therefrom and removing the flowable fluid is removed from the well.

An alternative to the last treatment includes introduction of a gravel packing material into the well bore, followed by the epoxy resin composition, maintaining the epoxy resin composition in contact with the gravel packing material for a time sufficient to coat the gravel packing material with epoxy resin and to partially or fully cure the epoxy resin and thereafter contacting the gravel packing material with the solvent composition of the present application for a time sufficient to solvate flow restricting materials present in the pore space between particles of the gravel packing material and form a flowable fluid therefrom and thereafter removing the flowable fluid to produce a consolidated permeable gravel pack. This same technique can be utilized when the gravel packing material is precoated at the surface of the earth.

By way of specific example, a well which had been treated with an epoxy resin composition, comprising the reaction product of epichlorohydrine and 2,2-bis(4-hydroxyphenyl) propane, N-tallow-1,3 diamino propane, as a curing agent, methanol, as a solvent, and xylene, as a diluent, became plugged with a gunky material. Efforts to clean out this flow-restricting material with acetone and with methanol were unsuccessful. However, the well was cleaned out and returned to production by introducing four drums of a 50/50 wt. mixture of N-methyl-2-pyrrolidone and xylene. After 72 hours of contact with the flow-restricting material, the well was flushed with surface water. Approximately 6 barrels of the gunky flow-restricting material was recovered. While specific materials and equipment and modes of operation have been mentioned herein, it is to be understood that such specific recitals are not to be considered limiting but are by way of illustration only and to set forth the best mode of operation in accordance with the present invention.

That which is claimed:

1. A method of removing flow-restricting material from a well penetrating a subsurface earth formation which has been treated with an epoxy resin composition comprising;
   (a) contacting said flow-restricting material with a solvent composition comprising N-methyl-2-pyrrolidone and from 0 to about 80% by weight of a diluent;
   (b) maintaining said solvent composition in contact with said flow-restricting material for a time sufficient to form a flowable fluid of said solvent composition and said flow-restricting material; and
   (c) removing said flowable fluid from said well.

2. A method in accordance with claim 1 wherein the well was treated with the epoxy resin composition to form a coating of epoxy resin on metallic surfaces in the well.

3. A method in accordance with claim 2 wherein the epoxy resin coating on the metallic equipment in the well was deposited for the purpose of preventing corrosion of said metallic equipment.

4. A method in accordance with claim 2 wherein the well was treated with the epoxy resin to coat metallic equipment in the well with epoxy resin for the purpose of preventing the deposition of organic and inorganic deposits on said metallic equipment.

5. A method in accordance with claim 1 wherein the well was treated with the epoxy resin composition to coat unconsolidated, non-metallic, particulate materials with epoxy resin and consolidate said particulate materials to form a permeable, consolidated mass.

6. A method in accordance with claim 5 wherein the particulate materials is a portion of an unconsolidated sand adjacent the well.

7. A method in accordance with claim 5 wherein the particulate material is a gravel packing material disposed in the well.

8. A method in accordance with claim 1 wherein the diluent is present in the solvent composition in an amount of about 50% by weight.

9. A method in accordance with claim 1 wherein the diluent is an aromatic hydrocarbon.

10. A method in accordance with claim 9 wherein the diluent is xylene.

11. A method of coating metallic equipment in a well penetrating a subsurface earth formation with an epoxy resin comprising:
   (a) introducing an epoxy resin composition into the well in contact with said metallic equipment,
   (b) maintaining said epoxy resin composition in contact with said metallic equipment for a time sufficient to coat said metallic equipment with epoxy resin and at least partially cure said epoxy resin;

(c) introducing a solvent composition comprising N-methyl-2-pyrrolidone and a diluent in an amount of about 0 to about 80% by weight into said well in contact with the epoxy resin composition;

(d) maintaining said solvent composition in said well for a time sufficient to form a flowable fluid of said solvent and flow-restricting materials; and (e) removing said flowable fluid from said well.

12. A method in accordance with claim 11 wherein the metallic equipment was coated with epoxy resin under conditions and in a manner to reduce corrosion of said metallic equipment.

13. A method in accordance with claim 11 wherein the metallic equipment was coated with epoxy resin under conditions and in a manner to prevent the deposition of solid materials on the surface of said metallic equipment.

14. A method in accordance with claim 11 wherein the diluent is present in the solvent composition in an amount of about 50% by weight.

15. A method in accordance with claim 11 wherein the diluent is an aromatic hydrocarbon.

16. A method in accordance with claim 14 wherein the aromatic hydrocarbon is xylene.

17. A method for producing a consolidated, permeable mass of particulate material below the surface of the earth at a preselected subsurface location penetrated by a well bore comprising:

(a) forming a mass of particulate material coated with an epoxy resin and consolidating said particulate material at said subsurface location;

(b) introducing a solvent compositon comprising N-methyl-2-pyrrolidone and for 0 to about 80% by weight of a diluent into said consolidated mass of coated particulate material;

(c) maintaining said solvent composition in contact with said coated, consolidated particulate material for a time sufficient to form a flowable fluid of flow-restricting materials contained in the void spaces between the particulate materials; and (d) removing said solvent composition containing said flow-restricting materials from the well to produce a consolidated permeable mass at the subsurface location.

18. A method in accordance with claim 17 wherein the particulate material is the portion of an unconsolidated subsurface sand formation adjacent the well.

19. A method in accordance with claim 17 wherein the particulate material is a gravel packing material introduced into the wellbore.

20. A method in accordance with claim 16 wherein the diluent is present in the solvent composition in an amount of about 50% by weight.

21. A method in accordance with claim 16 wherein the diluent is an aromatic hydrocarbon.

22. A method in accordance with claim 20 wherein the diluent is xylene.

* * * * *